United States Patent [19]

Hirose

[11] 4,437,127

[45] Mar. 13, 1984

[54] DOCUMENT INFORMATION FILING SYSTEM

[75] Inventor: Kenji Hirose, Yokohama, Japan

[73] Assignee: Tokyo Shibaura Denki Kabushiki Kaisha, Kawasaki, Japan

[21] Appl. No.: 315,656

[22] Filed: Oct. 27, 1981

[30] Foreign Application Priority Data

Oct. 31, 1980 [JP] Japan ................................ 55-153274

[51] Int. Cl.³ .............................................. H04N 1/22
[52] U.S. Cl. .................................... 358/296; 358/257; 358/301; 364/419; 364/900
[58] Field of Search ............... 358/296, 256, 294, 102, 358/257, 301; 364/419, 514, 200, 900

[56] References Cited

U.S. PATENT DOCUMENTS

| | | | |
|---|---|---|---|
| 3,611,301 | 5/1968 | Parks | 364/200 |
| 4,013,876 | 3/1977 | Anstin | 235/151 |
| 4,032,900 | 6/1977 | Kashio . | |
| 4,041,463 | 8/1977 | Slutzky | 364/900 |
| 4,205,780 | 6/1980 | Burns et al. | 364/521 |
| 4,206,483 | 6/1980 | Nakamura | 360/33 |
| 4,357,638 | 11/1982 | Yoshimaru et al. | 360/72.2 |

FOREIGN PATENT DOCUMENTS 2363347  4/1974  Fed. Rep. of Germany .

Primary Examiner—John C. Martin
Assistant Examiner—Edward L. Coles
Attorney, Agent, or Firm—Cushman, Darby & Cushman

[57] ABSTRACT

Title information, which contains management information representing the kind or class of document information be recorded and index information representing the title and recording position of each document information, is provided for the recording and retrieving of the document information. When recording document information, title information is reproduced from an index information recording track of a magnetic tape and written in a title memory. A CPU executes an auxiliary decision as to if the management information of the reproduced title information corresponds to any of various management information preliminarily memorized, a first decision as to if the management information of document information newly applied from a keyboard corresponds to the various management information, and a second decision as to if the title applied from the keyboard coincides with a title in the title memory. The CPU inhibits the recording of document information at least one of the auxiliary decision and the first decision is unsatisfied and/or the second decision is satisfied.

11 Claims, 7 Drawing Figures

FIG. 3
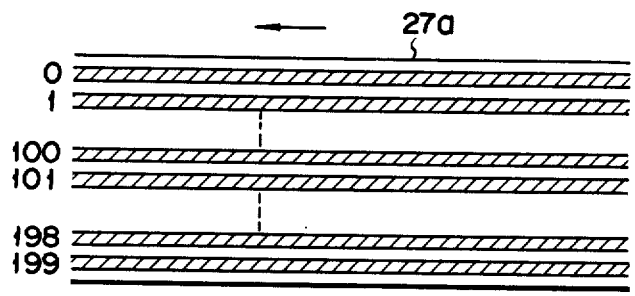
FIG. 4
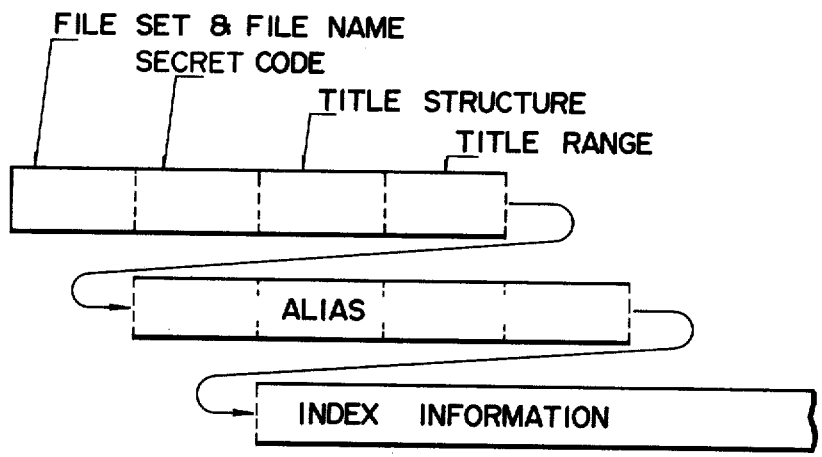
FIG. 5
| TITLE | L | T·ADR | S. ADR | S |
|---|---|---|---|---|
| 20 | 1 | 2 | 1 | 1 |
| 25 | | | | |

DOCUMENT INFORMATION FILING SYSTEM

BACKGROUND OF THE INVENTION

This invention relates to document information filing systems for successively recording image information of documents or the like in a storage device and retrieving and reading out given document information among various image information stored in the storage device when required.

Recently, document information filing systems have been developed and put to practical use. According to such document information filing system, each of a great deal of documents or the like is scanned by a scanner to produce document information which are progressively stored in a storage device. The desired document information among the various document information stored in the storage device is retrieved and read out for being reproduced into a visual state by an output device such as a cathode-ray-tube (CRT) display or a copying device.

In such document information filing systems, a plurality of magnetic tape cassettes suitably set in a video tape recorder are called respective files and given respective file names in correspondence to the kinds of classes of the document information stored. Of these files, those of the same kind or class or those related to one another are collectively called a file set. Such file sets are given respective file set names. In other words, the file set name is an upper class name with respect to the file name which is a subordinate class name.

While the number of file sets is increased with increasing document information, there should be no file sets of the same file name. Also, there should be no files of the same file name in one file set.

Further, while various pieces of document information stored in one file are given respective peculiar titles, there should be no different pieces of document information in one file that are given the same title.

SUMMARY OF THE INVENTION

It is an object of the invention to provide a document information filing system, which can prevent from the assignment of an identical file set name to a plurality of file sets, the assignment of an identical file name to a plurality of files and the assignment of an identical title to a plurality of different pieces of image information in one file.

According to the invention, there is provided a document information filing system, which comprises a title memory for storing title information read out from a recording medium by a video recorder, a management information memory in which management information representing various file sets and various files are stored, and deciding means for executing an auxiliary decision as to if management information contained in the title information stored in the title memory corresponds to any management information in the management information memory, a first decision as to if the management information of keyed-in title information corresponds to any of various management information and a second decision as to if the title of the keyed-in title information coincides with any title of title information in the title memory, the deciding means acting to inhibit the recording of document information when at least one of the auxiliary decision and the first decision is unsatisfied and/or the second decision is satisfied.

BRIEF DESCRIPTION OF THE DRAWINGS

FIG. 3 is a view showing tracks of a magnetic tape;

FIG. 4 is a view showing the format of title information recorded on the tape shown in FIG. 3;

FIG. 5 is a view showing the format of index information in the title information shown in FIG. 4.

DETAILED DESCRIPTION OF THE PREFERRED EMBODIMENT

Figure 1:
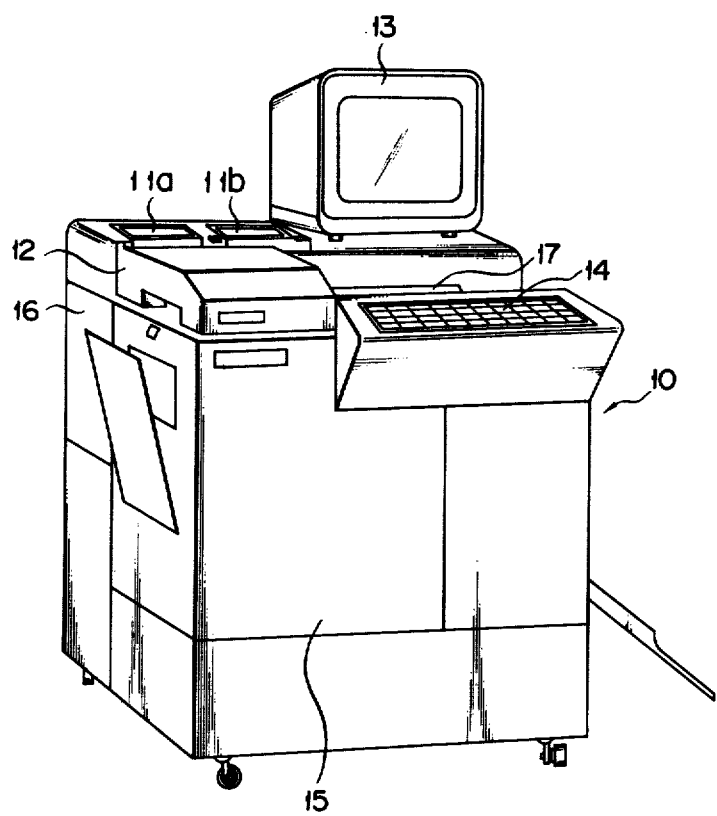
FIG. 1 is a perspective view showing an embodiment of the document information filing system according to the invention.

FIG. 1 shows a document information filing system. On top of a console 10 a longitudinal video recorders 11a and 11b, a document scanner 12 and a cathode-ray-tube (CRT) display 13 are provided. A keyboard 14 is provided on the front side of an upper portion of the console 10, and a copying device 15 is provided inside the console 10. The copying device 15 is constituted by a usual electrophotographic copying device. A floppy disc device 16 is provided inside the console 10 adjacent to one side thereof.

Figure 2:
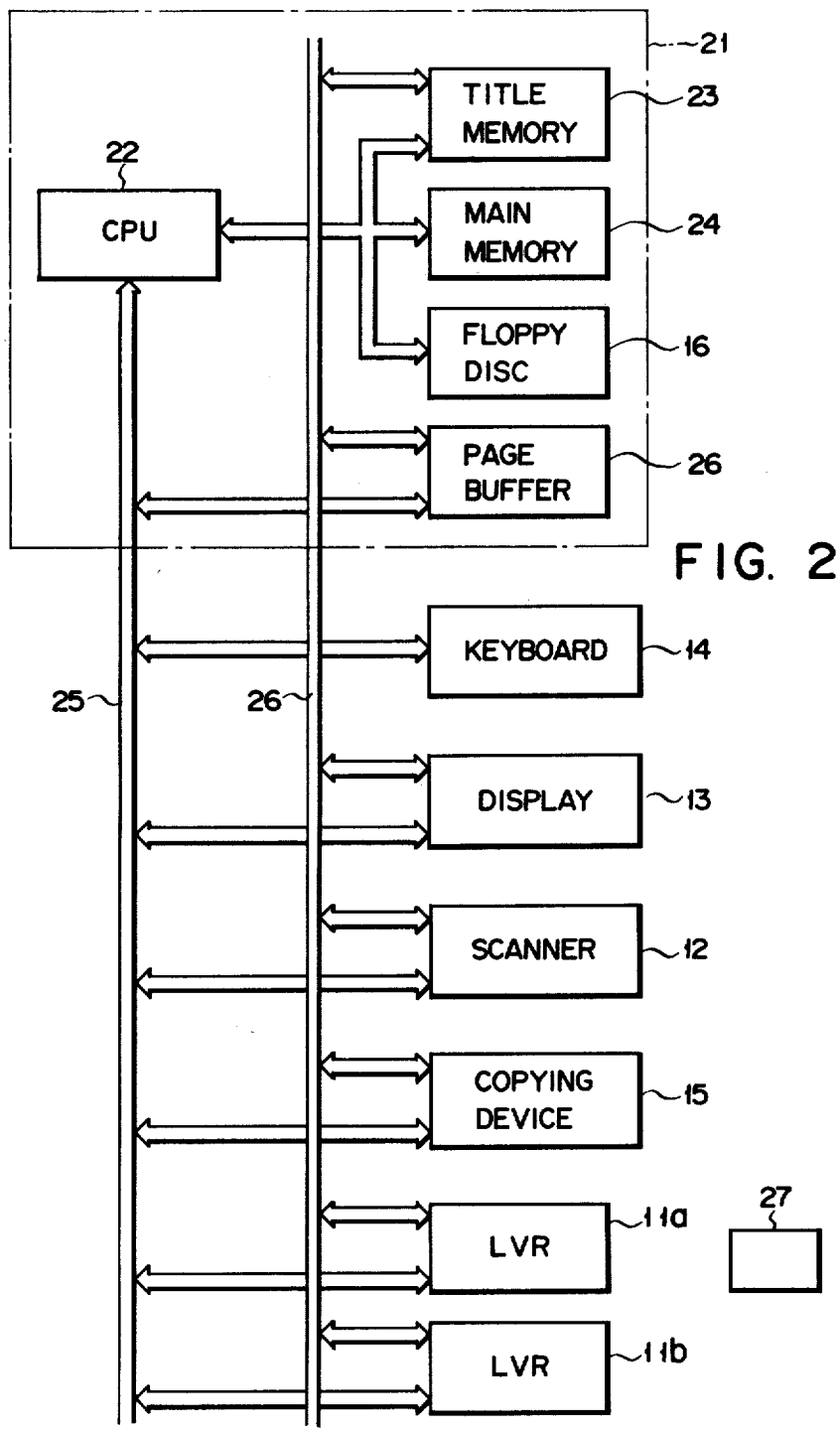
FIG. 2 is a block diagram showing the circuit construction of the document information filing system.

FIG. 2 shows a block diagram of the circuit of the document information filing system. The circuit comprises a control section 21, which includes a central processing unit (CPU) 22 and a title memory 23, a main memory 24 and the floppy disc device 16 connected to the CPU 22. The CPU 22 is also connected through an input/output (I/0) control bus 25 to a page buffer 26, a keyboard 14, the CRT display 13, the scanner 12, the copying device 15, the main longitudinal video recorder (LVR) 11a and the back-up LVR 11b. The title memory 23 and page buffer 26 are connected to an image bus 26. The image bus 26 is connected to the CRT display 13, scanner 12, copying device 15 and LVRs 11a and 11b. In the LVRs 11a and 11b, an endless tape cassette 27 is loaded. In the endless tape cassette 27 an endless magnetic tape 27a is accommodated. As shown in FIG. 3, the endless magnetic tape 27a has a width in which 200 recording tracks, namely tracks No. 0 to No. 199, are formed. Of these tracks, the tracks No. 100 and No. 101 are index information tracks, and the other tracks, that is, tracks No. 0 to No. 99 and No. 102 to No. 199, are image information recording tracks. The magnetic tape 27a is divided in the tape running direction into 256 sectors. In the index information tracks No. 100, title information is recorded according to a format as shown in FIGS. 4 and 5. In the track No. 101 the same title information as that in the track No. 100 is recorded. In this case, the title information recorded in the track No. 100 and that recorded in the track No. 101 are shifted in position relative to each other in the direction of the tracks. As shown in FIG. 4, the title information contains a title set and file name code, a secret code, a title structure code, a title range code and an alias code, and index information. As shown in FIG. 5, the index information contains a title code, which consists of 20 digits divided into 6 items at the most, and an address code for 5 digits. The address code consists of a 1-digit image information length L (the number of sectors), a 2-digit image information recording track address (track No.) T.ADR, a 1-digit image information recording sector address S-ADR, and a 1-digit document size S.

The file as a unit corresponds to one magnetic tape cassette in this system. The file set is a group of files concerning the contents of the same kind. The file and file set code is represented by 14 or less alphanumeric letters, kana letters or special symbols. The secret code is provided for the confidential purpose, and it contains a filing confidential code to permit only the filter to effect processing of the file content such as storage, change and deletion, and a retrieving confidential code to permit only an operator with a permission to retrieve or a qualified person to effect retrieving. The file structure code expresses items of titles that can be set for a single piece of image information, for instance as the lectureship, course, field, record date, etc. when the image information concerns learning or study. The title range code represents the range of document information that can be recorded in a single file. The alias code shows an alias if such alias is contained in a particular title item. For example, in the course the mathematics, physics, social study, foreign language, etc. constitute alias.

Figure 6A:
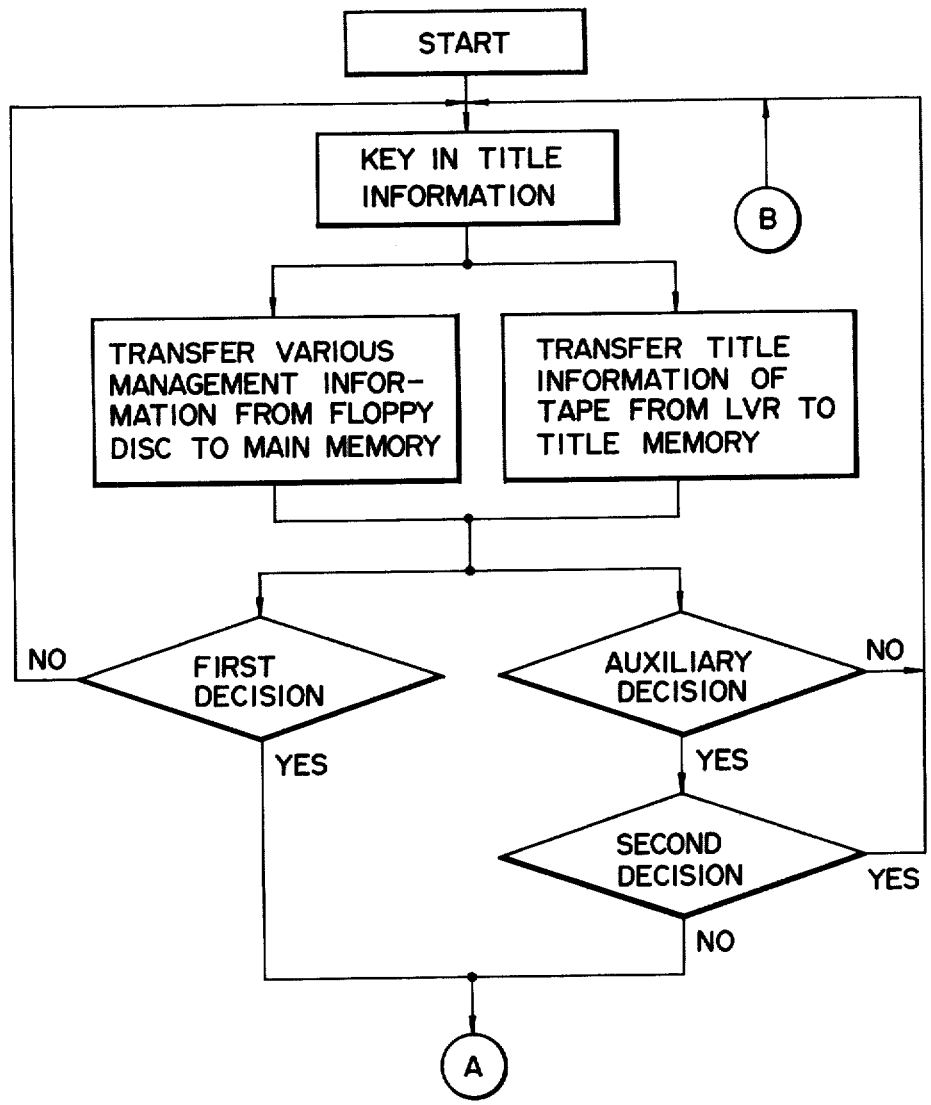
FIGS. 6A and 6B are a flow chart showing the operation of the document information filing system.
Figure 6B:
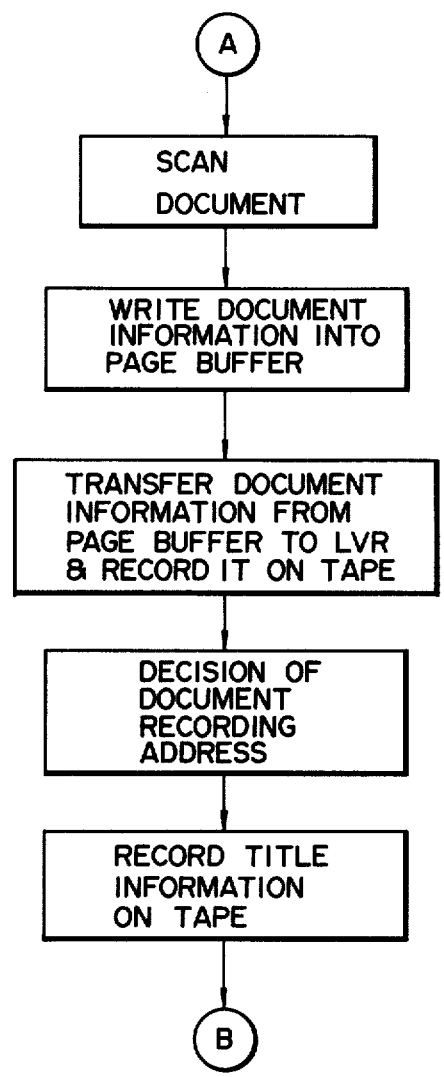

Now, the operation of the document information filing system according to the invention will be described with reference to the flow chart of FIGS. 6A and 6B.

First, the operation will be described in connection with the registration of document information. In this case, the magnetic tape cassette 27 is loaded in the LVR 11a, and a document is placed on a document base 17. Then, a start is set in the keyboard 14, a select mode, i.e., "RETRIEVAL", "RECORD", "DELETE" and "CHANGE", is displayed on the CRT display 13. Subsequently, the "RECORD" mode is set by the keyboard 14, and the title information of the document to be registered, i.e., the management information containing the file set name, file name, secret code, title structure code, title range and alias and index information containing the title and document size corresponding to the document information, is keyed-in from the keyboard 14. The CPU 22 executes a record program and causes the keyed-in title information to be written in the main memory 24. When it is confirmed that the keying-in of the title information is ended, a confirmation key, i.e., "NL" key on the keyboard is depressed. As a result, the LVR is rendered operative to read out the title information from the index information recording track No. 100 or 101 of the magnetic tape 27a. The read-out title information is written in the title memory 23. In other words, the title information is transferred from the LVR 11a to the title memory 23. At the same time, various management information are transferred from the floppy disc device 16 to the main memory 24. The CPU 22 checks if the management information of the title information of the title memory 23, i.e., title information read out from the tape, corresponds to any of the various management information of the main memory 24, that is, it executes an auxiliary decision. This decision, however, is deemed ineffective since no title information is recorded on the tape. The CPU 22 also checks if the management information (file set name, file name) of the keyed-in title information stored in the main memory 24 corresponds to any of the various management information, that is, it executes a first decision. If this decision yields "NO", no image information storing operation is brought about, and the keying-in is requested again. If the first decision yields "YES", the scanner 12 is rendered operative to scan the document and provide document information corresponding to the document pattern. The document information from the scanner 12 is written in the page buffer 26. When document information for one page has been written in the page buffer, it is transferred to the LVR 11a and recorded thereby in an image recording track of the magnetic tape 27a. The CPU 22 detects the track number and sector number of the track where the document information is recorded and produces address of the document information recorded. The CPU 22 then produces the title information as shown in FIG. 4 from the address mentioned above, the index information and the management information stored in the main memory 24, i.e., keyed-in management and index information. The title information thus produced is written in the title memory 23. When image information for one page has been recorded on the magnetic tape 27a, it is ready to record image information of the next document. In this case, the same operation as in case of newly recording document information on the magnetic tape 27a, on which some document information has already been recorded, takes place. This operation will now be described.

When the magnetic tape cassette 27 with some document information already recorded on tape is loaded in the LVR 11a and the title of a document is keyed-in from the keyboard 14, LVR 11a reads out title information from the index information track (track No. 100 or 101) of the magnetic tape 27a. The title information read out is all written in the title memory 23. The document title and size are written in the main memory 24. At this time, the management information of the floppy disc device 16 is transferred to and written in the main memory 24. The CPU 22 then executes the auxiliary decision as to if the management information of the title information of the title memory 23, i.e., the management information of the magnetic tape 27a corresponds to any of the management information of the floppy disc. If this auxiliary decision yields "NO", the operation is returned to the keying-in step as shown in FIG. 6A. The CPU 22 is also at this time going to execute the first decision, i.e., checking as to if the keyed-in management information corresponds to the management information of the floppy disc, but this first decision is deemed ineffective since no management information is keyed in. If the auxiliary decision yields "YES", the CPU 22 executes a second decision, that is, it checks if the keyed-in title stored in the file memory 23 coincides with the title of the various index information. If this decision yields "YES", the operation is returned to the keying-in step. This has an effect of preventing the registration of coincident titles in a file. If the second decision yields "NO", the recording of image information is allowed. In this case, the document is scanned by the scanner 12, and the document information corresponding to the document pattern is stored in the base buffer 26. When document information for one page has been written, it is transferred to the LVR 11a and recorded in any of the recording tracks No. 0 to 99 and 102 to 199 of the magnetic tape 27a. At this time, the recording is made subsequent to the track and sectors where document information is already recorded. When new document information is recorded, the CPU 22 determines the image information recording position on the basis of the numbers of the tracks and sectors where the new document information is to be recorded and produces address of the new document information. The CPU 22 produces index information as shown in FIG. 5 from this address together with document size and title. The index information thus produced is written in the title memory 24. At this time, the relevant management information is also written in the title memory 24. In this way, several units of image information is recorded on the magnetic tape 27a. When the recording of image information is ended, the management information and index information stored in the title memory 24 is successively recorded in the index information recording track of the magnetic tape 27a. Thus, the title information in the index information recording track is renewed.

Now, the operation in case when retrieving and reading out desired image information among the document information stored on the magnetic tape 27a will be described. In this case, the "retrieval mode" is set by the keyboard 14. When this mode is set, the CPU 22 produces an instruction to cause the LVR 11a to read out title information from the index information recording track of the magnetic tape 27a. The title information from the LVR 11a is collectively transferred to and written in the title memory 23. It is also displayed on the display 31. The operator finds index information corresponding to the desired image information among the index information of the title information displayed on the display 13, and keys in the title of the intended index information from the keyboard 14. Index information corresponding to the keyed-in title is then retrieved. When the intended index information is detected, the corresponding image information is read out on the basis of the address of that index information. The read-out image information is stored in the page buffer 26. The image information stored in the page buffer 26 is displayed on the display 13. If desired, the document information is reproduced as a hard copy by the copying device 15.

As has been described in the foregoing, according to the invention the storage of document information is inhibited if newly keyed-in management information corresponds to none of the various management information preset for the document information filing system and also if the keyed-in title coincides with one of the titles of the various management information. Thus, it is possible to prevent the coincidence of a plurality of file set names, the coincidence of a plurality of file names and the coincidence of a plurality of title names in one file.

While in the embodiment use has been made of the magnetic tape as the recording medium, it is also possible to use optical discs or magnetic discs. In this case, an optical disc device or a magnetic disc device is used for the recording and reproduction of information.

What is claimed is:

1. A document information filing system comprising:
a scanner for scanning a document to produce a document information;
recording and reproducing means for recording and reproducing document information and title information corresponding to the document information in and from a recording medium;
means for providing title information concerning document information to be newly recorded in said recording medium;
a storage section for storing various management information for predetermined fields; and
deciding means for executing an auxiliary decision as to if the title information reproduced by said recording and reproducing means corresponds to a title information in the various management information in said storage section, a first decision as to if the title information provided by said coupling means corresponds to a title information in any of the various management information in said memory section and a second decision as to if particular information of the title information reproduced by said recording and reproducing means coincides with particular information of the title information provided from said title information providing means and providing an instruction to inhibit the recording of document information when at least one of said auxiliary decision and said first decision is unsatisfied and/or said second decision is satisfied.

2. The document information filing system according to claim 1, wherein the title information reproduced by said recording and reproducing means is stored in a title memory, said document information is stored for one page after another in a page buffer, the title information provided by said title information providing means and the various management information in said storage section are transferred to and stored in a main memory, said title memory, main memory and storage section are connected to said deciding means, and said deciding means effects the auxiliary decision, first decision and second decision according to information stored in said memories and storage section.

3. The document information filing system according to claim 1 or 2, wherein said storage section is by a floppy disc device.

4. The document information filing system according to claim 1, wherein said recording and reproducing means is a video recorder.

5. The document information filing system according to claim 1 or 2, wherein said document information and title information are displayed on a cathode-ray-tube display.

6. The document information filing system according to claim 1, 2 or 4, wherein said title information contains management information representing a file set name, a file name, a secret code, a title structure, a title range and alias and index information representing a title and write/read address.

7. A document information filing system comprising:
a scanner for providing document information by scanning a document;
means for providing title information of document information to be newly recorded in a recording medium;
storage means in which various management information for predetermined fields are stored;
a main memory for storing information from said title information providing means and said storage means;
recording and reproducing means for recording and reproducing title information and title information of document information in and from said recording medium;
a title memory for storing the title information reproduced by said recording and reproducing means; and
means connected to said main memory and title memory, for executing an auxiliary decision as to if management information of the reproduced title information of said title memory corresponds to the various management information transferred to said main memory, a first decision as to if management information of the title information of said title information providing means stored in said main memory corresponds to the various management information in said main memory and a second decision as to if particular information of the title information stored in said title memory corresponds to particular information of the title information of said providing means stored in said main memory and inhibiting the recording of document information when at least one of said auxiliary decision and said first decision is unsatisfied and/or said second decision is satisfied.

8. The document information filing system according to claim 7, wherein said title information and document information are displayed on a display.

9. The document information filing system according to claim 7, wherein said document information is rendered visible for unit information after another on sheets by a copying device.

10. The document information filing system according to claim 7, wherein said recording reproducing means is a video recorder.

11. The document information filing system according to claim 7, wherein said storage means is a floppy disc device.

* * * * *